US011170654B2

(12) United States Patent
Ringer et al.

(10) Patent No.: US 11,170,654 B2
(45) Date of Patent: Nov. 9, 2021

(54) AUTHORIZING A FLIGHT OF AN UNMANNED AERIAL VEHICLE (UAV)

(71) Applicant: Verizon Patent and Licensing Inc., Basking Ridge, NJ (US)

(72) Inventors: Eric T. Ringer, Portland, OR (US); Mark B. Nelson, Portland, OR (US); Charles E. Fiedler, III, Portland, OR (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 370 days.

(21) Appl. No.: 15/905,300

(22) Filed: Feb. 26, 2018

(65) Prior Publication Data

US 2019/0266899 A1 Aug. 29, 2019

(51) Int. Cl.
| | |
|---|---|
| *G08G 5/00* | (2006.01) |
| *B64C 39/02* | (2006.01) |
| *G06Q 10/00* | (2012.01) |
| *G06F 21/00* | (2013.01) |
| *H04W 4/00* | (2018.01) |

(52) U.S. Cl.
CPC ......... *G08G 5/0026* (2013.01); *B64C 39/024* (2013.01); *G06F 21/00* (2013.01); *G06Q 10/00* (2013.01); *G08G 5/003* (2013.01); *G08G 5/0013* (2013.01); *G08G 5/0069* (2013.01); *H04W 4/00* (2013.01); *B64C 2201/146* (2013.01)

(58) Field of Classification Search
CPC .... G08G 5/0021; G08G 5/003; G08G 5/0013; G08G 5/0082; G08G 5/0069; G08G 5/006; G08G 5/0026; B64C 2201/146; B64C 39/024; H04W 4/00; G06Q 10/00; G06F 21/00
See application file for complete search history.

(56) References Cited

U.S. PATENT DOCUMENTS

| | | | | |
|---|---|---|---|---|
| 2016/0335898 | A1* | 11/2016 | Caplan | G08G 5/0052 |
| 2018/0253092 | A1* | 9/2018 | Trapero Esteban | G05D 1/0022 |
| 2020/0023968 | A1* | 1/2020 | Wu | G08C 17/02 |
| 2020/0074730 | A1* | 3/2020 | Shloosh | G06T 17/05 |

* cited by examiner

*Primary Examiner* — Mathew Franklin Gordon (57) ABSTRACT

An example device includes one or more memories; and one or more processors, communicatively coupled to the one or more memories, to receive a request to authorize a flight of an unmanned aerial vehicle (UAV), wherein the UAV is locked by a locking mechanism until the flight is authorized and the request includes flight information that identifies a location of the flight, and a pilot identifier of a pilot of the flight; obtain a pilot certification of the pilot based on the pilot identifier; identify a first flight regulation of a flight regulation system, wherein the first flight regulation includes information identifying a threshold pilot certification to pilot the UAV at the location; determine whether the pilot certification of the pilot satisfies the threshold pilot certification to pilot the UAV at the location; and when the pilot certification of the pilot satisfies the threshold pilot certification to pilot the UAV at the location, provide a key to unlock the UAV to permit the flight of the UAV to commence.

20 Claims, 6 Drawing Sheets

AUTHORIZING A FLIGHT OF AN UNMANNED AERIAL VEHICLE (UAV)

BACKGROUND

Unmanned aerial vehicles (UAVs) are often operated in a variety of areas, by a variety of users, and for a variety of purposes. For example, UAVs can perform recreational flights and/or commercial flights (e.g., for delivery, for surveillance, for transportation, and/or the like). Accordingly, UAVs can be piloted by amateur users and/or professional users.

DETAILED DESCRIPTION OF PREFERRED EMBODIMENTS

The following detailed description of example implementations refers to the accompanying drawings. The same reference numbers in different drawings can identify the same or similar elements.

An unmanned aerial vehicle (UAV) can include a locking system that prevents the UAV from taking flight for any particular reason. For example, a locking system can be controlled based on a location of the UAV, an environment of the UAV (which can be sensed by a variety of sensors, such as temperature sensors, pressure sensors, humidity sensors, and/or the like), and/or the like. In such cases, if the UAV is in a restricted location (e.g., near an airport, near a secure area, and/or the like), the locking system of the UAV can prevent the UAV from flying. In some instances, the locking mechanism can be software, firmware, and/or hardware that is pre-installed or configured within the UAV during a manufacturing stage, during an update to the UAV (e.g., a software or firmware update), during a configuration of the UAV, and/or the like. Accordingly, although a particular user (e.g., a pilot) can be authorized to fly a particular UAV in a restricted location, the locking mechanism of the UAV can still prevent the UAV from taking flight.

According to some implementations described herein, a flight authorization system is provided to enable a UAV to be unlocked from a flight restriction and/or authorized to fly (or take flight). As such, as environments (e.g., locations, weather conditions, and/or the like), user (or pilot) characteristics (e.g., experience level, certifications/licenses, flight times, and/or the like), and/or flight regulations change (e.g., over a period of time), the flight authorization system can adaptively authorize or prevent flights of a UAV. Therefore, UAVs can be authorized to fly under various conditions, enabling dynamic authorization of flights, rather than the static restrictions that are configured during manufacture of the UAV. Some implementations herein, ensure UAV safety by only authorizing flights that satisfy flight regulations for particular areas, particular times of day, particular pilot certifications, particular pilot location (e.g., within line of sight, outside of line of sight), particular environmental or weather conditions, and/or the like. Furthermore, examples herein provide an objective system to authorize a flight of a UAV, thus avoiding user potential error (e.g., of a human flight regulator) when authorizing flights or not authorizing flights of UAVs.

Figure 1A:
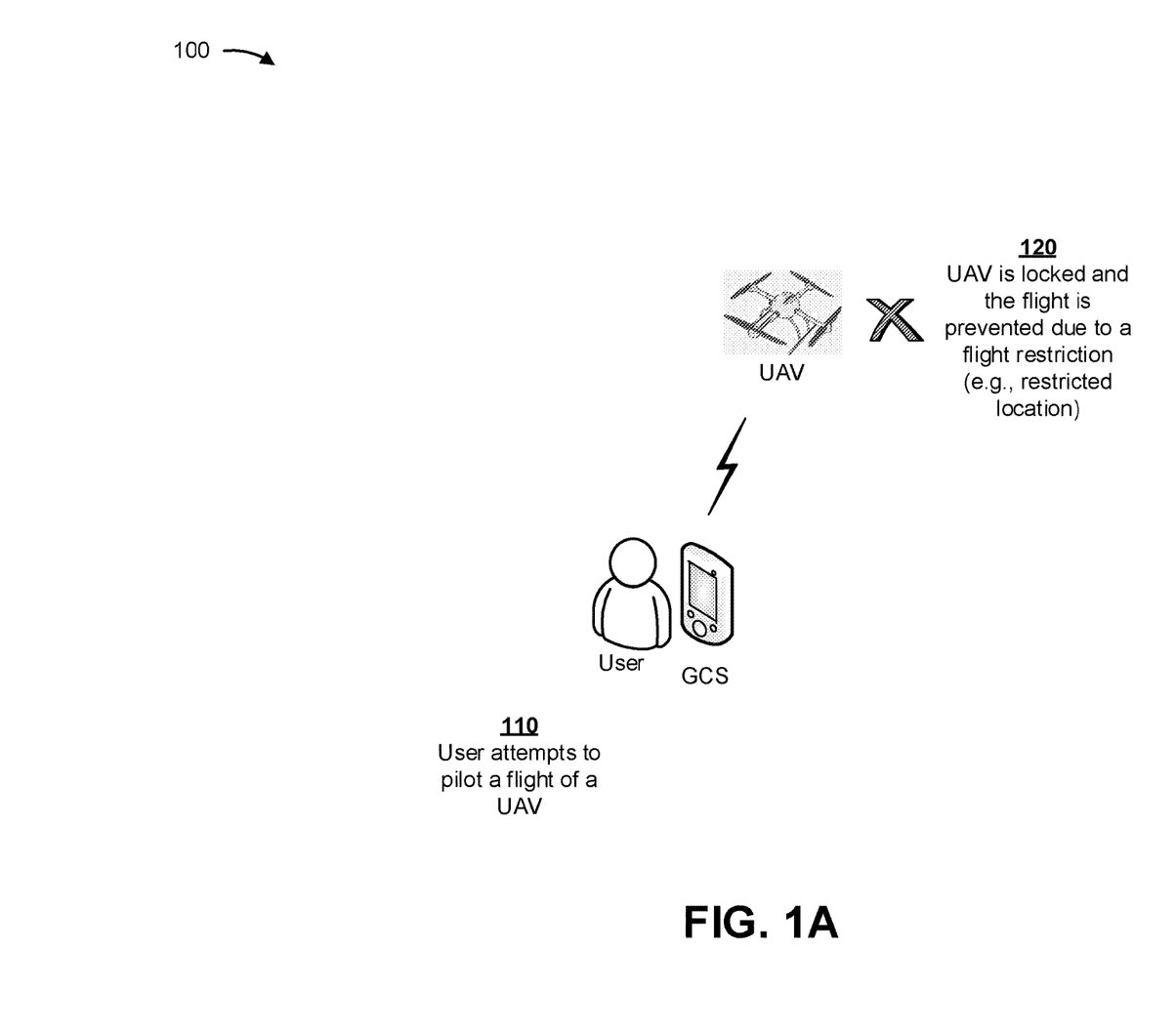
FIGS. 1A-1C are diagrams of an overview of an example implementation described herein.
Figure 1B:
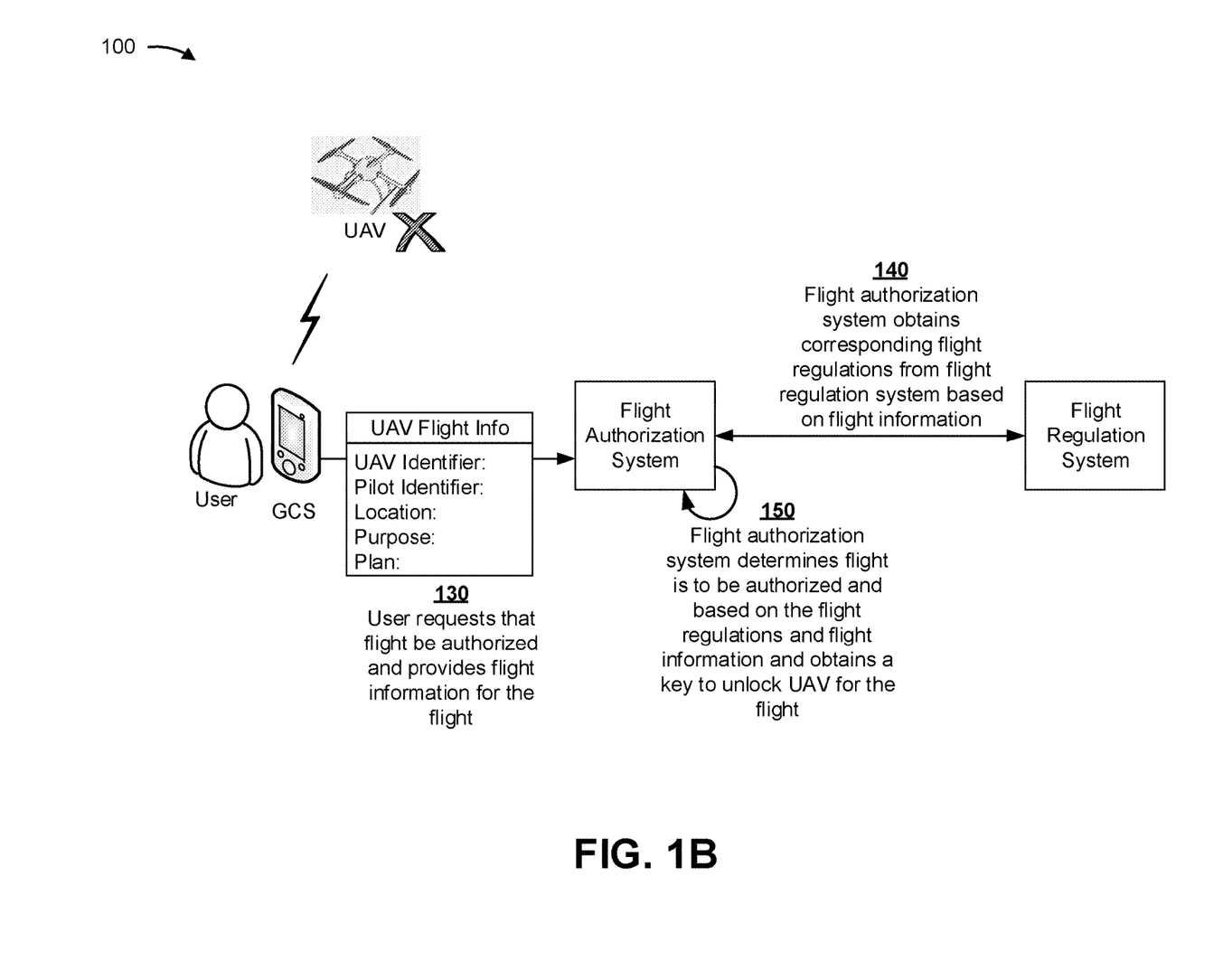
Figure 1C:
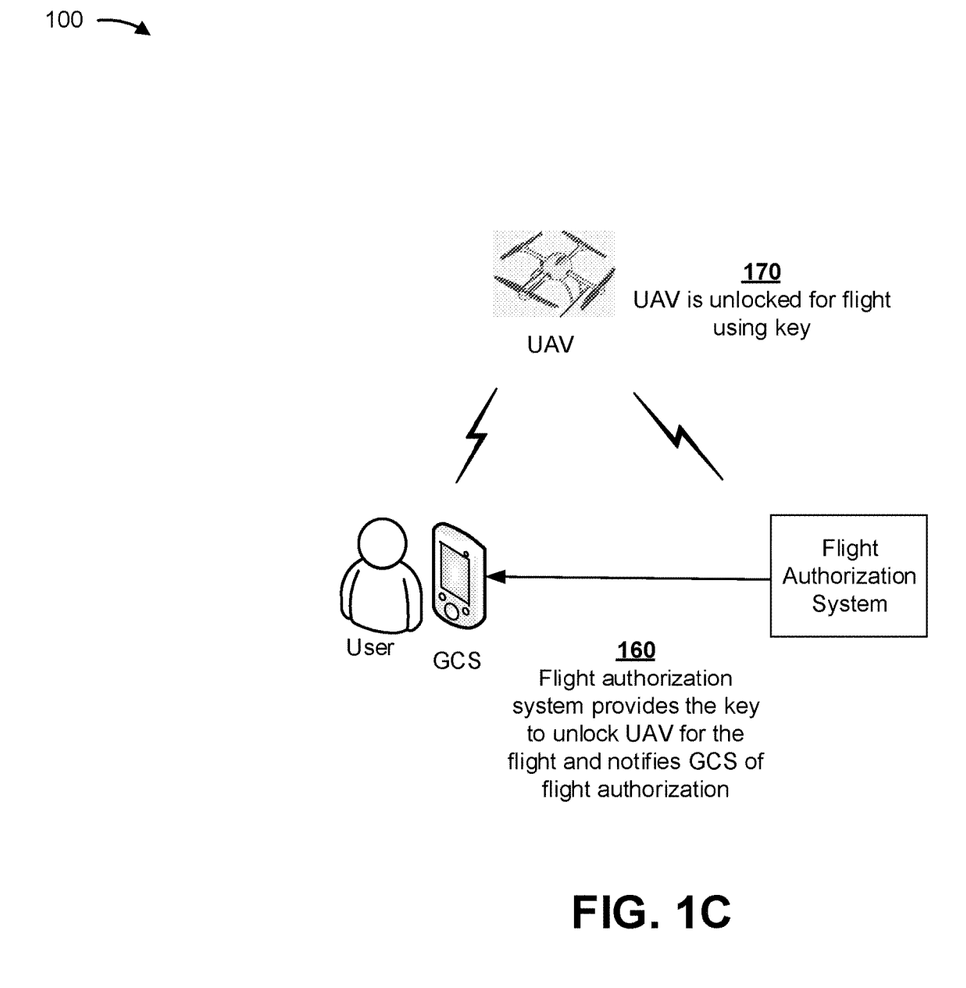

FIGS. 1A-1C are diagrams of an overview of an example implementation 100 described herein. In FIGS. 1A-1C, a flight authorization system is used to unlock a UAV to enable a user to pilot a flight of a UAV, according to example implementations described herein. As shown in FIG. 1A, and by reference number 110, a user attempts to pilot a flight of a UAV via a ground control station (GCS). However, as shown by reference number 120, the UAV is locked and the flight is prevented due to a flight restriction. For example, the UAV can be located within a threshold range of a controlled air space or a restricted air space and/or within a threshold range of a structure associated with a controlled air space and/or restricted air space. In such cases, the UAV can be locked by a locking mechanism that is pre-installed or configured to lock the UAV to prevent the UAV from taking flight based on restricted locations or other restriction characteristics (e.g., weather conditions of the environment of the UAV, altitude of the UAV, and/or the like).

As shown in FIG. 1B, and by reference number 130, the user requests a flight authorization system to authorize the flight by providing flight information for the flight. For example, as shown, the flight information can include a UAV identifier, a pilot identifier (which can be the user identifier), location information of the UAV (e.g., coordinates of the UAV), a purpose for the flight (e.g., recreational, commercial, and/or the like), and a plan for the flight (e.g., projected flight location information, flight altitude(s), and/or the like). As shown by reference number 140, the flight authorization system obtains corresponding flight regulations from the flight regulation system based on the flight information. For example, the flight authorization system can obtain information that flight regulations that identify pilot certification thresholds for pilots to fly a UAV at the particular location. As shown by reference number 150, the flight authorization system determines that the flight is to be authorized based on the flight regulations and the flight information and obtains a key to unlock the UAV for the flight. For example, the flight authorization system, based on the pilot identifier, can determine the pilot is licensed (e.g., from a pilot certification database) to fly in the particular location of the UAV. As such, the flight authorization system can obtain the key (e.g., by generating a key, by receiving a key from a manufacturer of the UAV, and/or the like) to enable the user to unlock the UAV.

As shown in FIG. 1C, and by reference number 160, the flight authorization system provides the key to unlock the UAV for the flight and notifies the GCS of the flight authorization. As shown by reference number 170, the UAV is unlocked for the flight using the key. In some implementations, the UAV can be unlocked via the GCS providing the key to the UAV. Additionally, or alternatively, the flight authorization system can unlock the UAV for the flight. In some implementations, the user can unlock the UAV by entering the key through a user interface of the UAV. According to some implementations, the UAV may communicate with the flight authorization system during the flight. For example, the UAV may provide flight information (e.g., that may indicate a location of the flight). In some implementations, the flight authorization system can monitor the location of the flight and instruct the UAV (and/or control the UAV) to cease a flight and/or return to a particular location if the UAV violates a flight regulation.

Accordingly, an example flight regulation system can authorize a flight of a UAV based on specific flight information for the flight and corresponding flight regulations of a flight regulation system. As such, as flight information for different flights change or vary and flight regulations of the flight regulation system change, UAVs can be specifically and adaptively authorized or not authorized for certain flights.

As indicated above, FIG. 1A-1C are provided merely as an example. Other examples are possible and can differ from what was described with regard to FIGS. 1A-1C.

Figure 2:
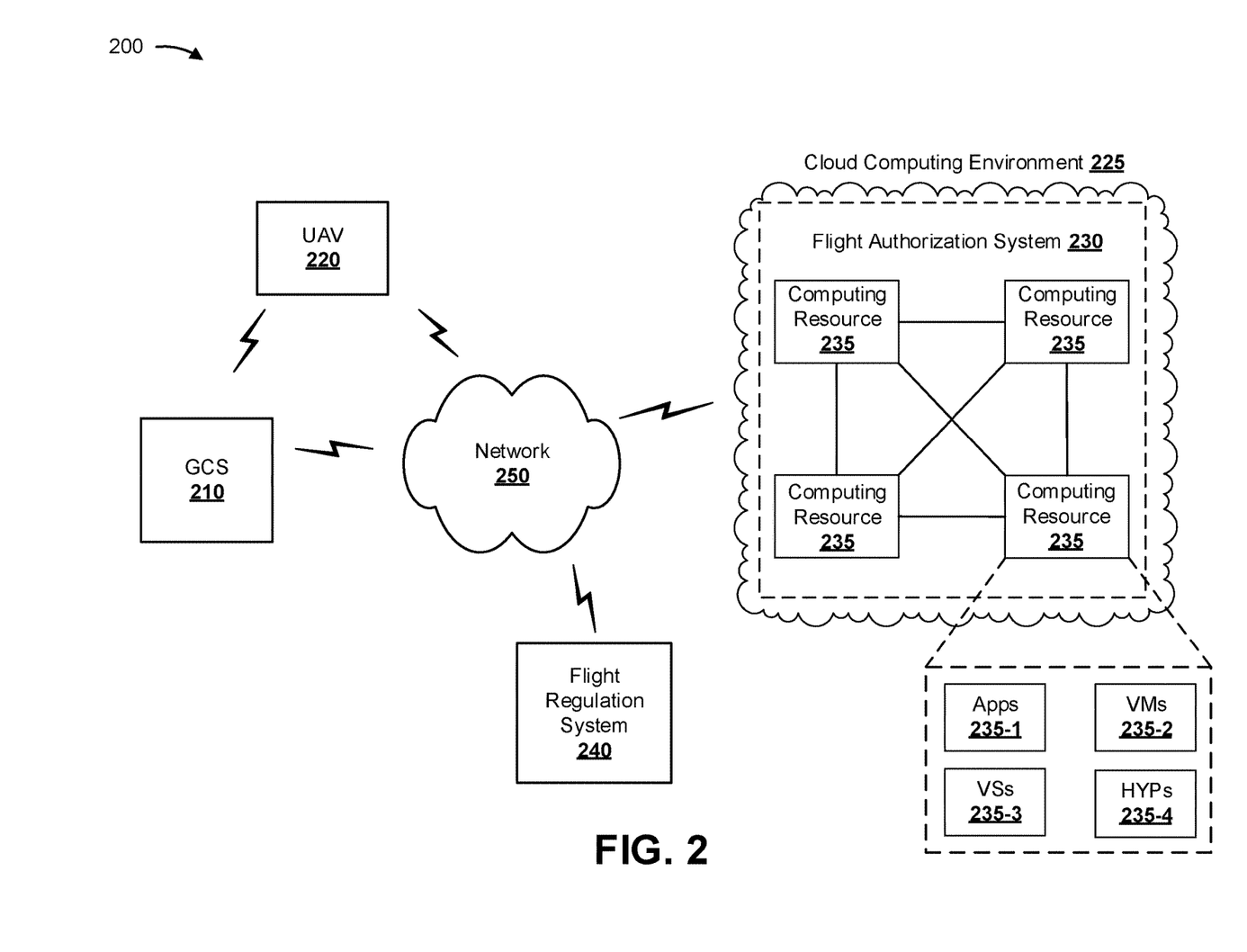
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a GCS 210, a UAV 220, a cloud computing environment 225 hosting a flight authorization system 230, a flight regulation system 240, and a network 250. Devices of environment 200 can interconnect via wired connections, wireless connections, or a combination of wired and wireless connections.

GCS 210 includes one or more user devices capable of receiving, generating, storing, processing, and/or providing information associated with controlling UAV 220. For example, GCS 210 can include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, GCS 210 can include an input device or peripheral for providing input, such as a touch screen display, keyboard, or microphone (e.g., for inputting flight data). Additionally, or alternatively, GCS 210 can include a UAV remote control device or other UAV equipment in communication with a UAV.

UAV 220 includes aircraft without a human pilot aboard, and can also be referred to as an unmanned aircraft (UA), drone, remotely piloted vehicle (RPV), remotely piloted aircraft (RPA), or remotely operated aircraft (ROA). UAV 220 can have a variety of shapes, sizes, configurations, characteristics, etc. for a variety of purposes and applications. In some implementations, UAV 220 can include one or more sensors, such as an electromagnetic spectrum sensor (e.g., visual spectrum, infrared, or near infrared cameras, radar systems, etc.), a biological sensor, a temperature sensor, a chemical sensor, a humidity sensor, a pressure sensor, a global positioning system (GPS), an accelerometer, a gyroscope, an inertial measurement unit, a magnetometer, and/or the like. In some implementations, UAV 220 can include one or more components for communicating with GCS 210, flight authorization system 230, flight regulation system 240, (e.g., a component for communicating via network 250, such as a long-term evolution (LTE) communications component). For example, UAV 220 can be controlled by GCS 210 and/or authorized to fly via communication with GCS 210 and/or network 250.

Cloud computing environment 225 includes an environment that delivers computing as a service, whereby shared resources, services, etc. can be provided to GCS 210, UAV 220, and/or flight regulation system 240. Cloud computing environment 225 can provide computation, software, data access, storage, and/or other services that do not require end-user knowledge of a physical location and configuration of a system and/or a device that delivers the services. As shown, cloud computing environment 225 can include flight authorization system 230.

Flight authorization system 230 includes one or more devices capable of receiving, providing, storing, generating, and/or processing information associated with authorizing a flight of UAV 220. In some implementations, flight authorization system 230 can include one or more data structures for storing, updating, and/or processing information associated with a flight of UAV 220. For example, flight authorization system 230 can include or maintain data associated with pilot information (e.g., a pilot identifier, pilot certification information, pilot location information, pilot experience information, and/or the like), UAV information (e.g., UAV identifiers, UAV manufacturer information, UAV locking mechanism information, and/or the like), environment information (e.g., weather information, security information, restriction information, and/or the like), and/or the like.

Computing resource 235 includes one or more personal computers, workstation computers, server devices, or another type of computation and/or communication device. In some implementations, computing resource 235 can host flight authorization system 230. The cloud resources can include compute instances executing in computing resource 235, storage devices provided in computing resource 235, data transfer devices provided by computing resource 235, etc. In some implementations, computing resource 235 can communicate with other computing resources 235 via wired connections, wireless connections, or a combination of wired and wireless connections.

As further shown in FIG. 2, computing resource 235 can include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that can be provided to or accessed by GCS 210, UAV 220, and/or flight regulation system 240. Application 235-1 can eliminate a need to install and execute the software applications on GCS 210, UAV 220, and/or flight regulation system 240. For example, application 235-1 can include software associated with flight authorization system 230 and/or any other software capable of being provided via cloud computing environment 225. In some implementations, one application 235-1 can send/receive information to/from one or more other applications 235-1, via virtual machine 235-2.

Virtual machine 235-2 includes a software implementation of a machine (e.g., a computer) that executes programs like a physical machine. Virtual machine 235-2 can be either a system virtual machine or a process virtual machine, depending upon use and degree of correspondence to any real machine by virtual machine 235-2. A system virtual machine can provide a complete system platform that supports execution of a complete operating system ("OS"). A process virtual machine can execute a single program, and can support a single process. In some implementations, virtual machine 235-2 can execute on behalf of a user device (e.g., GCS 210, UAV 220), and can manage infrastructure of cloud computing environment 225, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 can present a virtual operating platform to the guest operating systems, and can manage the execution of the guest operating systems. Multiple instances of a variety of operating systems can share virtualized hardware resources.

Flight regulation system 240 includes one or more devices capable of receiving, providing, storing, generating, and/or processing information associated with regulating a flight of UAV 220. In some implementations, the flight regulation system 240 can include a data structure and/or update a data structure that includes flight regulations associated with flights of UAV 220 and/or other UAVs similar to UAV 220. For example, the flight regulations can indicate particular flight characteristics that can be required authorize a particular flight of UAV 220 (at a particular time and/or location). In some implementations, flight regulation system 240 can be owned and/or maintained by a governmental entity, a regulatory entity, and/or industrial entity (e.g., a national government, a regional government (e.g., a state government, a provincial government, and/or the like), a local government (e.g., a township, a county government, a city government, and/or the like)), a regulatory authority of an industry (e.g., an aviation organization), and/or an agency of a government (e.g., the Federal Aviation Agency (FAA)), and/or the like).

Network 250 includes one or more wired and/or wireless networks. For example, network 250 can include a cellular network (e.g., a LTE network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
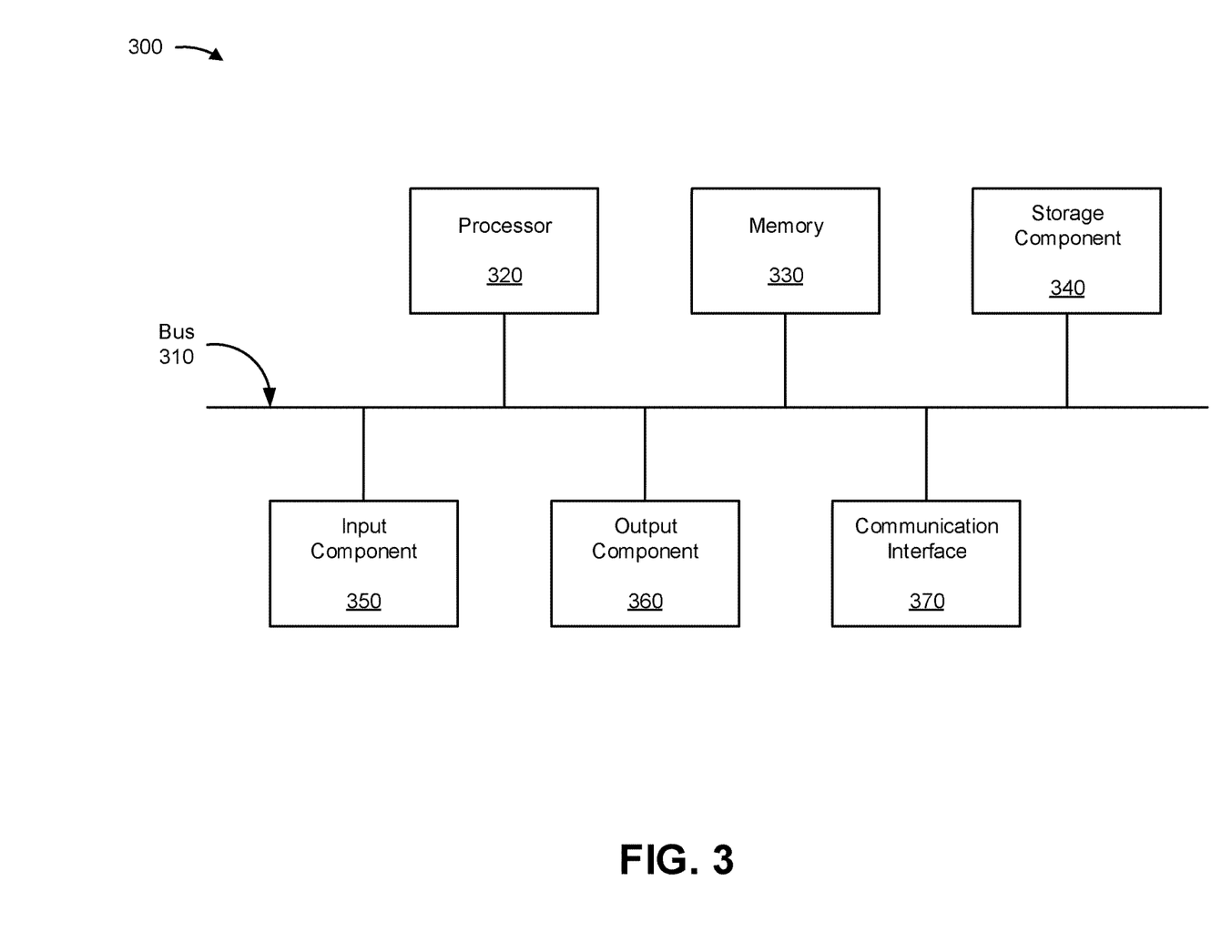
FIG. 3 is a diagram of example components of one or more devices of FIG. 2.

FIG. 3 is a diagram of example components of a device 300. Device 300 can correspond to GCS 210, UAV 220, flight authorization system 230, computing resource 235, and/or flight regulation system 240. In some implementations, GCS 210, UAV 220, flight authorization system 230, computing resource 235, and/or flight regulation system 240 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
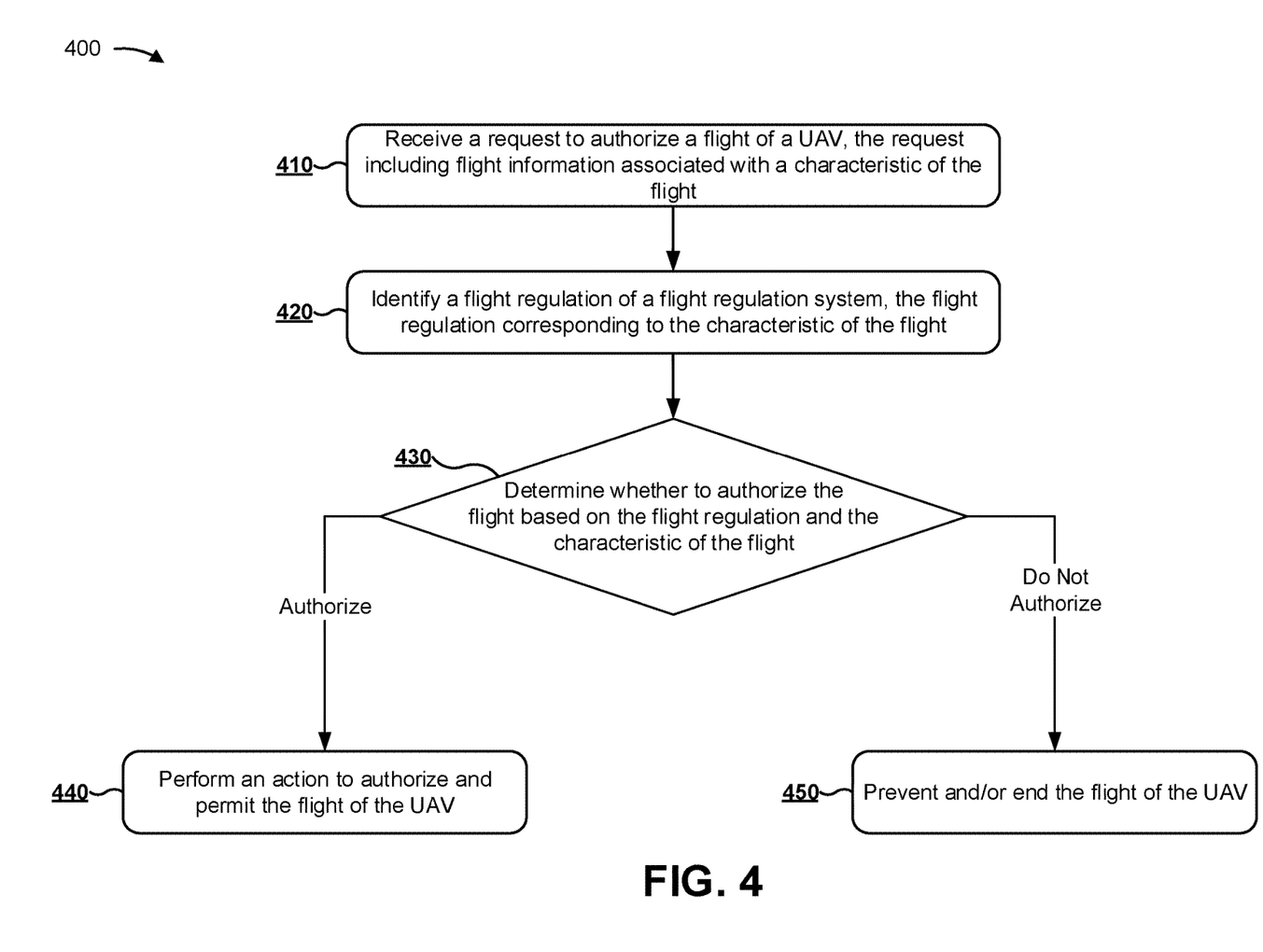
FIG. 4 is a flow chart of an example process for authorizing a flight of an unmanned aerial vehicle (UAV).

FIG. 4 is a flow chart of an example process 400 for authorizing a flight of a UAV. In some implementations, one or more process blocks of FIG. 4 can be performed by flight authorization system 230. In some implementations, one or more process blocks of FIG. 4 can be performed by another device or a group of devices separate from or including flight authorization system 230, such as GCS 210, UAV 220, and/or flight regulation system 240.

As shown in FIG. 4, process 400 can include receiving a request to authorize a flight of a UAV, the request including flight information associated with a characteristic of the flight (block 410). For example, flight authorization system 230 can receive the request to authorize the flight. In some implementations, flight authorization system 230 can receive the request based on GCS 210 initiating a flight of UAV 220, based on UAV 220 being activated, based on GCS 210 being activated, based on a user input (e.g., received via UAV 220 and/or GCS 210), and/or the like.

According to some implementations, a request can be a message, a text, a packet, an email, an image, and/or any type of communication of a communication protocol that includes information indicating that a flight of UAV 220 is to be authorized. The example request can be received from GCS 210 and/or UAV 220. The example request can include flight information that is associated with one or more characteristics of the flight. For example, the flight information can include one or more characteristics, such as one or more of: flight date, a flight plan (e.g., flight time, flight duration, flight altitude, flight origin location, flight destination location, flight path, and/or the like), pilot identifier, pilot location, environmental information (e.g., wind speed, humidity, temperature, precipitation, visibility, sunset time, and/or the like), a UAV identifier (e.g., a make identifier, a model identifier, and/or the like), and/or the like.

In some implementations, flight authorization system 230 can use various characteristics of the flight in the flight information to derive other information or characteristics about the flight. For example, from the pilot location and the UAV location (or a flight path for the flight), flight authorization system 230 can determine whether the pilot will be in line of sight of UAV 220 during the flight or outside of line of sight of UAV 220. More specifically, in such an example, flight authorization system 230 can calculate a distance between UAV 220 (e.g., over 1000 feet can indicate outside of line of sight and within 1000 feet can indicate that the UAV 220 is to be within line of sight) and the pilot location and/or determine whether there can be any obstructions in between UAV 220 and/or the pilot (e.g., based on mapping information maintained by flight authorization system 230).

Requests to authorize a flight can be provided to flight authorization system 230 device in a variety of ways. Flight authorization system 230 can, in some implementations, receive requests to authorize flights for many UAVs (similar to UAV 220) from many GCSs (similar to GCS 210), UAVs, and/or the like. For example, flight authorization system 230 can receive millions, billions, trillions, etc. of requests to authorize flights of UAVs from hundreds, thousands, millions, etc. of sources regarding hundreds, thousands, millions, etc. of UAVs and UAV flights. Thus, flight authorization system 230 can operate upon big data using big data techniques that cannot be processed by human operators.

In some implementations, UAV 220 can be configured to include or can include a locking mechanism that prevents UAV 220 from being able to be controlled by GCS 210. For example, the locking mechanism can be configured to prevent UAV 220 from commencing flights when UAV 220 is in a restricted area (e.g., near an airport, near a secure facility, and/or the like), is an environment with weather restrictions (e.g. poor visibility, high wind speeds, and/or the like), and/or the like. In such cases, the locking mechanism, which can be pre-installed or configured to lock the UAV during manufacturing or an initial setup of UAV 220, can be unlocked via an authorization from flight authorization system 230. Accordingly, in some implementations, UAV 220, by default, cannot commence a flight until GCS 210 and/or UAV 220 receives an authorization (or a key) from flight authorization system 230 to unlock the locking mechanism.

According to some implementations described herein, flight authorization system 230 authorizes or does not authorize flights of UAV 220. As used herein, a flight of UAV 220 can refer to any travel or movement of UAV 220 when under control of GCS 210. For example, a flight of UAV 220 can be a path traveled over a duration of time and/or through an air space according to control instructions received from GCS 210. Accordingly, if a flight of UAV 220 is authorized, GCS 210 can be used to control UAV 220 to begin and/or perform the flight, and if a flight of UAV 220 were not authorized, GCS 210 can be unable to control UAV 220 to begin and/or continue the flight.

In some implementations, requests to authorize a flight and/or flight information, associated with the flight and UAV 220, can be received by flight authorization system 230 from GCS 210. For example, before, during, and/or after a flight, GCS 210 can provide a pilot identifier, a UAV identifier, a pilot location, a UAV location, and/or other flight data to flight authorization system 230. GCS 210 can, in some implementations, obtain the flight information from user input and/or communications with UAV 220. For example, a user can provide a user identifier as user input to GCS 210 and/or global positioning satellite (GPS) equipment on GCS 210 and/or UAV 220 can be used to periodically obtain pilot location information identifying a location of a pilot of UAV 220 and/or location information identifying a location of UAV 220 that can be provided to flight authorization system 230 to authorize the flight.

In some implementations, GCS 210 and/or UAV 220 can use a verification system (e.g., a passcode, biometric information, and/or the like) to verify that a user is the identified pilot (as denoted by a pilot identifier in the flight information) of UAV 220. According to some implementations, flight authorization system 230 can obtain verification from GCS 210 that a pilot identifier indicated in the flight information corresponds to an actual pilot of UAV 220. For example, flight authorization system 230 can request GCS 210 to provide a verification that a user of GCS 210 is the pilot identified in the flight information. Additionally, or alternatively, flight authorization system 230 can request GCS 210 to obtain biometric information (e.g., perform a fingerprint scan, perform a facial scan, and/or the like) that can be used to verify the pilot. For example, flight authorization system 230 can compare the biometric information received from GCS 210 to biometric information for the identified pilot in the flight information that is stored in a data structure of flight authorization system 230. In some implementations, flight authorization system 230 can perform a secondary authentication method (e.g., by sending a notification to an identified pilot) to verify that the identified pilot is the actual pilot of the flight of UAV 220.

In this way, flight authorization system 230 can receive a request to authorize a flight of UAV 220 to enable flight authorization system 230 to identify a flight regulation corresponding to the flight of UAV 220.

As further shown in FIG. 4, process 400 can include identifying a flight regulation of a flight regulation system, the flight regulation corresponding to the characteristic of the flight (block 420). For example, flight authorization system 230 can identify one or more flight regulations from flight regulation system 240 that correspond to one or more characteristics of a flight of UAV 220. In some implementations, flight authorization system 230 can identify a flight regulation based on receiving the request to authorize the flight of UAV 220 and a characteristic of the flight within flight information of the request.

A flight regulation can be a rule or law that is maintained by and/or enforced by an entity associated with flight regulation system 240. In some implementations, a flight regulation can include one or more thresholds corresponding to one or more characteristics of a flight of UAV 220. For example, a flight regulation can indicate that a pilot must satisfy threshold requirements (e.g., have a particular pilot certification or license, be a particular age, have a particular level of experience, have a particular length of flight time, and/or the like) in order to pilot UAV 220 in a particular area or location, at a particular time of day, within line of sight (or out of line of sight), for a particular length of time, and/or the like. Accordingly, a flight regulation can be a requirement that is to be satisfied (as outlined in the provided flight information) to enable flight authorization system 230 to authorize the flight of UAV 220.

According to some implementations, the flight regulations can be received from, provided by, and/or maintained by flight regulation system 240. In some implementations, flight authorization system 230 can update and/or maintain flight regulations in a data structure of flight authorization system 230. For example, flight authorization system 230 can periodically obtain flight regulations from flight regulation system 240 and update flight regulations in the data structure of flight authorization system 230.

In some implementations, flight authorization system 230 can identify a flight regulation based on one or more characteristics of the flight included in the flight information of the request. For example, flight authorization system 230 can identify flight regulations from flight regulation system 240 based on a location of the flight of UAV 220. For example, flight regulation system 240 can maintain flight regulations based on locations and/or classifications of locations. Accordingly, when a flight of UAV 220 is to take place in a location that can be considered restricted, flight authorization system 230 can provide information that indicates that the flight is in restricted air space and/or flight regulation system 240 can determine that the flight is in restricted air space, and a corresponding flight regulation for flying UAV 220 in a restricted air space can be obtained. In such a case, the flight regulation can indicate that the pilot is to have a threshold pilot certification (e.g., a threshold level of pilot certification) to enable the flight of UAV 220. Furthermore, in some implementations, further flight regulations can indicate one or more additional threshold pilot certifications for the pilot to fly UAV 220 under additional corresponding circumstances of the flight (e.g., if the flight is going to be within line of sight or outside of line of sight, if environmental conditions or weather conditions of the flight indicate particular wind speeds, if UAV 220 is a particular size, and/or the like).

In this way, flight authorization system 230 can identify a flight regulation corresponding to the flight of UAV 220 to determine whether to authorize the flight.

As further shown in FIG. 4, process 400 can include determining whether to authorize the flight based on the flight regulation and the characteristic of the flight (block 430). For example, flight authorization system 230 can determine whether to authorize the flight. In some implementations, flight authorization system 230 can determine whether to authorize the flight based on receiving the request to authorize the flight and/or identifying the flight regulation corresponding to the flight.

According to some implementations, flight authorization system 230 can include a data structure that includes information associated with UAV 220 and/or information associated with a user (or pilot) of UAV 220 and/or GCS 210. For example, the data structure can store UAV information related to at least one of UAV model number, UAV owner/operator, UAV pilot, UAV flight ceiling, UAV weight, UAV maximum payload, UAV maximum wind speed, UAV maximum operating temperature, UAV minimum operating temperature, UAV maximum communication range, UAV maximum flight duration, UAV maximum speed, UAV maintenance data (e.g., an occurrence and/or log of maintenance performed on a UAV), UAV noise level (e.g., in terms of noise generated by a UAV). Additionally, or alternatively, a data structure of flight authorization system 230 can include pilot information associated with the user, such as pilot certifications, pilot maximum operating wind speed (e.g., a maximum wind speed in which a pilot is licensed to fly), pilot maximum flight operating duration (e.g., a time limit in minutes, hours, etc. for a pilot to control a UAV in the air), pilot minimum operating visibility (e.g., a minimum visibility in which a pilot is licensed to fly), pilot maximum operating range (e.g., in terms of a maximum measure of distance between pilot and UAV at which a pilot is licensed to fly and/or whether a pilot is licensed to operate a UAV outside of line of sight), most recent pilot flight (e.g., hours, days, etc. since last UAV flight piloted), career pilot hours (e.g., total hours flown by a pilot in a particular UAV and/or all UAVs), pilot contact information, pilot employer contact information, and/or the like. In some implementations, the UAV information and/or pilot information of the user can be obtained via the GCS 210 (e.g., within a request to authorize of flight of UAV 220).

In some implementations, flight authorization system 230 can obtain pilot certification information based on the flight information or characteristic of the flight. For example, if a pilot identifier is included in the flight information as a characteristic of the flight, flight authorization system 230 can obtain pilot certification information from a pilot certification data structure. Additionally, or alternatively, other information can be obtained based on the flight information. For example, characteristics of the UAV can be obtained from a UAV data structure that indicates specifications and/or dimensions of UAV 220 that can be identified in the flight information by a UAV identifier.

In some implementations, flight authorization system 230 can determine whether to authorize a flight by comparing a characteristic of the flight (and/or other characteristics of the flight information) with a corresponding flight regulation. Accordingly, flight authorization system 230 can determine whether characteristics of the flight of UAV 220 satisfy threshold values and/or ranges of the corresponding flight regulations. For example, for a particular area or location of a flight of a UAV 220, flight authorization system 230 can determine whether the pilot has the level of certification to satisfy the threshold pilot certification to pilot the UAV 220 at that location. If the pilot does not have the level of certification to satisfy the threshold pilot certification (e.g., based on checking the pilots certification using the pilot identifier of the flight information), then flight authorization system 230 can determine that the flight is not to be authorized, and if the pilot does have the requisite level of certification, then the flight of UAV 220 can be authorized. As mentioned above, additional threshold levels of certification can be met for additional characteristics that can be included in the flight information.

In some implementations, if all thresholds of the flight regulation are not satisfied according to the provided flight information and/or characteristics of the flight of UAV 220, the flight cannot be authorized. In such cases, all thresholds of flight regulations for a particular flight must be satisfied according to the flight information in order for flight authorization system 230 to authorize the flight. In some implementations, flight authorization system 230 can authorize a flight of UAV 220 as long as certain thresholds of flight regulations that must be satisfied are met, despite other thresholds of the flight regulations not necessarily being satisfied. For example, a flight regulation can exist that a pilot must have a minimum flight time of 40 hours to fly in a particular air space and the pilot must have an "expert" pilot certification. In such cases, in some implementations, as long as the flight information indicates that the pilot has at least an "expert" pilot certification, though the flight information does not indicate total flight time for the pilot, flight authorization system 230 can still authorize the flight of UAV 220.

In some implementations, flight authorization system 230 can implement a scoring system to authorize a flight of UAV 220. For example, certain values ($v_i$) corresponding to the characteristics of the flight included in the flight information and weights ($w_i$) corresponding to how the regulations (i) can be used to compute an authorization score (s), using the following:

$$\sum_{i=1}^{N} v_i w_i = s \quad (1)$$

where N is the total number of regulations compared with the characteristics of the flight information. In some implementations, when the authorization score (s) satisfies a threshold, flight authorization system 230 can authorize the flight of UAV 220. It is noted that flight authorization system 230 can use any scoring system to determine whether to authorize a flight of UAV 220.

In this way, flight authorization system 230 can determine whether to authorize the flight based on the flight regulation and the characteristic of the flight to permit flight authorization system 230 to perform an action associated with the flight.

As further shown in FIG. 4, process 400 can include performing an action to authorize the flight of the UAV (block 440). For example, flight authorization system 230 can perform an action to authorize a flight of UAV 220 and/or perform an action to prevent or not authorize the flight of UAV 220. In some implementations, flight authorization system 230 can perform an action associated a flight of UAV 220 based on determining that the flight of UAV 220 is authorized and/or that the UAV 220 is operating within flight regulations.

In some implementations, when flight authorization system 230 determines that a flight of UAV 220 is authorized or is to be authorized (e.g., the flight information indicates that the flight regulations are satisfied, an authorization score calculated from the flight information satisfies a threshold to authorize the flight, and/or the like), flight authorization system 230 can perform an action to enable GCS 210 and/or UAV 220 to commence the flight. For example, flight authorization system 230 can generate a key or obtain a key to enable GCS 210 and/or UAV 220 to unlock a locking mechanism that prevents UAV 220 from commencing a flight without authorization (e.g., from flight authorization system 230). In some implementations, flight authorization system 230 can generate a key and provide the key to GCS 210 and/or UAV 220. In such cases, GCS 210 and/or UAV 220 can be configured to use the key to unlock UAV 220 using any suitable protocols (e.g., using a public key/private key pair).

In some implementations, flight authorization system 230 may generate a key based on the request, based on flight information (e.g., based one or more of a UAV identifier, a pilot identifier, a UAV location, a pilot location, a flight plan, and/or the like), and/or any other information that is accessible to GCS 210 and/or UAV 220. Accordingly, flight authorization system 230 may provide the key along with instructions for GCS 210 and/or UAV 220 to decode and/or use the key to unlock UAV 220 for the flight. In some implementations, flight authorization system 230 may provide the key to both GCS 210 and UAV 220, such that when GCS 210 sends the key to UAV 220, UAV 220 can determine that both keys have been received and the flight is authorized and the locking mechanism can be unlocked to enable the flight to commence (or continue).

In some implementations, flight authorization system 230 can obtain the key from a data structure (e.g., a key generator, a key database, a key index, and/or the like) maintained by, owned by, or operated by, an entity associated with UAV 220 that is separate from flight authorization system 230 (e.g., a manufacturer of UAV 220, an entity that is associated with the manufacturer of UAV 220, and/or the like).

According to some implementations, when flight authorization system 230 determines that a flight of UAV 220 is to be authorized, flight authorization system 230 can perform an action that includes sending a notification to GCS 210 and/or UAV 220 to indicate that the flight is authorized. For example, the notification can be a message, an email, a text, a packet, and/or any other communication transmitted to GCS 210 and/or UAV 220 (e.g., via network 250) using any suitable communication protocol. In some implementations, the notification can include the key to unlock UAV 220 to commence the authorized flight.

As further shown in FIG. 4, process 400 can include preventing and/or ending a flight of the UAV (block 450). For example, flight authorization system 230 can perform an action to ensure that UAV 220 is locked or remains locked from the flight and/or perform an action to end a flight of UAV 220. In some implementations, flight authorization system 230 can perform an action associated with preventing and/or ending a flight of UAV 220 based on determining that the flight of UAV 220 is not to be authorized and/or the UAV 220 is operating outside of flight regulations.

In some implementations, when flight authorization system 230 determines that a flight of UAV 220 is not to be authorized (e.g., the flight information does not indicate that the flight regulations are satisfied, an authorization score calculated from the flight information does not satisfy a threshold to authorize the flight, and/or the like and/or the like), flight authorization system 230 can perform an action that prevents GCS 210 and/or UAV 220 from be able to commence and/or perform the flight. For example, flight authorization system 230 can send a notification to GCS 210 and/or UAV 220 that includes information identifying that the flight is not authorized. In such cases, UAV 220 can include a default locking mechanism that prevents UAV 220 from taking flight without approval. As such, without a key to unlock UAV 220, when flight authorization system 230 does not provide such a key, flight authorization system 230 can perform an action that prevents the flight of UAV 220. In some implementations, flight authorization system 230 can send a key or instruction to GCS 210 and/or UAV 220 to effectively lock UAV 220 (e.g., by activating a locking mechanism that prevents UAV 220 from being controlled by GCS 210) and prevent UAV 220 from taking flight. For example, flight authorization system 230 can send a notification to GCS 210 and/or UAV 220 that places UAV 220 into lock mode until UAV 220 is authorized to take flight, until a subsequent request for a flight is received, and/or until a period of time passes.

In some implementations, flight authorization system 230 may monitor UAV 220 during the flight of UAV 220. In some implementations, when flight authorization system 230 determines that flight data received from UAV 220 indicates that UAV 220 is in violation of a flight regulation, flight authorization system 230 may inform the path of the flight of the UAV. For example, flight authorization system 230 can assume control of UAV 220, instruct UAV 220 to return to an original location of the flight (e.g., from where the flight was authorized to commence), instruct UAV 220 to return to a location near the pilot, order a failsafe maneuver of UAV 220 (e.g., to ensure the UAV 220 safely returns to an acceptable flight path), and/or land in place or land immediately (or where the UAV 220 is in violation of the flight regulation). Accordingly, flight authorization system 230 may receive real-time flight information from UAV 220 and lock UAV 220 and/or inform the flight of UAV 220 to ensure that UAV 220 is flown according to the flight regulations of the flight.

In this way, flight authorization system 230 can perform an action associated with authorizing a flight of UAV 220 or preventing the flight of UAV 220.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Accordingly, as described herein, a flight authorization system 230 is provided that enables a UAV 220 to be unlocked when flight information associated with a flight of UAV 220 indicates that characteristics of the flight satisfy flight regulations of the flight. As such, flights can be dynamically authorized on a case by case basis as flight characteristics and/or flight regulations change. In this way, a UAV (e.g., UAV 220) may not necessarily be controlled by standard and/or default controls that prevent the UAV from flying in certain restricted areas despite being piloted by a user that is licensed to pilot the UAV in that restricted area. Furthermore, some implementations described herein enhance UAV safety by ensuring that flights of UAV 220 are only authorized when flight regulations of the flights of the UAV are satisfied (e.g., that a pilot of UAV 220 is authorized to fly the UAV at a particular location, at a particular time of day, under particular environmental conditions or weather conditions, from a particular location relative to UAV 220, and/or the like).

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
receive a request to authorize a flight of an unmanned aerial vehicle (UAV),
wherein the UAV is locked by a locking mechanism until the flight is authorized,
the request including
flight information for the flight
determine a plurality of flight characteristics of the flight based on the flight information;
identify a plurality of flight regulations of a flight regulation system,
each flight regulation, of the plurality of flight regulations, being associated with a respective flight characteristic of the plurality of flight characteristics, and
the one or more processors, when identifying the plurality of flight regulations, are further to:
identify a corresponding rule, associated with each flight characteristic, of the plurality of flight characteristics, that is enforced by an entity associated with the flight regulation system;
assign a weight to each flight characteristic, of the plurality of flight characteristics, based on the associated flight regulation,
wherein each weight corresponds to how the associated flight regulation is used to compute an authorization score;
determine the authorization score based on the assigned weights and the plurality of flight characteristics; and
provide, from a data structure and when determining that the authorization score satisfies a threshold, a key to unlock the UAV to permit the flight of the UAV to commence.

2. The device of claim 1, wherein the plurality of flight characteristics are associated with at least one of:
location information identifying a location of the UAV,
a pilot identifier of the pilot of the flight,
a UAV identifier of the UAV, or
a flight plan for the flight.

3. The device of claim 1, wherein the flight information includes at least one of:
an identifier of the UAV,
location information identifying a location of the UAV, or
a pilot identifier of a pilot of the flight.

4. The device of claim 3, wherein the flight information includes the location information and the pilot identifier, and the one or more processors are further to:
obtain a pilot certification of the pilot based on the pilot identifier; and
determine whether the pilot certification of the pilot satisfies a threshold pilot certification to pilot the UAV at the location,
wherein the threshold pilot certification is included in information from a flight regulation of the plurality of flight regulations, and
wherein the one or more processors, when determining whether the pilot certification of the pilot satisfies the threshold pilot certification, are to:
compare the pilot certification of the flight information with the threshold pilot certification of the flight regulation, and
determine that the pilot certification of the pilot satisfies the threshold pilot certification based on comparing the pilot certification of the flight information with the threshold pilot certification of the flight regulation.

5. The device of claim 3, wherein the flight information includes the location information and the pilot identifier, and further includes information identifying a pilot location, and wherein the one or more processors are to:
identify a flight regulation of the plurality of flight regulations;
the flight regulation including information identifying a threshold pilot certification to pilot, from the pilot location, the UAV at the location; and
determine that a pilot certification of the pilot satisfies the threshold pilot certification to pilot the UAV, from the pilot location, at the location,
wherein the pilot certification of the pilot is obtained based on the pilot identifier.

6. The device of claim 1, wherein the one or more processors are to:
when the authorization score does not satisfy the threshold, provide a notification to a ground control station (GCS) associated with the UAV to indicate that the flight is not authorized.

7. The device of claim 3, wherein the flight information includes the pilot identifier and the one or more processors are further to:
obtain a verification, from a ground control station (GCS) associated with the UAV, that the pilot identifier corresponds to an actual pilot of the UAV.

8. A non-transitory computer-readable medium storing instructions, the instructions comprising:
one or more instructions that, when executed by one or more processors, cause the one or more processors to:
receive a request to authorize a flight of an unmanned aerial vehicle (UAV),
wherein the UAV is locked by a locking mechanism until the flight is authorized,
the request including
flight information for the flight
determine a plurality of flight characteristics of the flight based on the flight information;
identify a plurality of flight regulations of a flight regulation system,
each flight regulation, of the plurality of flight regulations, being associated with a respective flight characteristic of the plurality of flight characteristics, and
the one or more instructions, that cause the one or more processors to identify the plurality of flight regulations, causing the one or more processors to further:
identify a corresponding rule, associated with each flight characteristic, of the plurality of flight characteristics, that is enforced by an entity associated with the flight regulation system characteristic;
assign a weight to each flight characteristic, of the plurality of flight characteristics, based on the associated flight regulation,
wherein each weight corresponds to how the associated flight regulation is used to compute an authorization score;

determine the authorization score based on the assigned
weights and the plurality of flight characteristics; and
provide, from a data structure and when determining
that the authorization score satisfies a threshold, a
key to unlock the UAV to permit the flight of the
UAV to commence.

9. The non-transitory computer-readable medium of claim
8, wherein the plurality of flight characteristics are associated with at least one of:
location information identifying a location of the UAV,
a pilot identifier of the pilot of the flight,
a UAV identifier of the UAV, or
a flight plan for the flight.

10. The non-transitory computer-readable medium of
claim 8, wherein the the flight information includes at least
one of:
an identifier of the UAV,
location information identifying a location of the UAV, or
a pilot identifier of a pilot of the flight.

11. The non-transitory computer-readable medium of
claim 10, wherein the flight information includes the location information and the pilot identifier, and the one or more
instructions further cause the one or more processors to:
obtain a pilot certification of the pilot based on the pilot
identifier; and
determine whether the pilot certification of the pilot
satisfies a threshold pilot certification to pilot the UAV
at the location,
wherein the threshold pilot certification is included in
information from a flight regulation, of the plurality
of flight regulations, and wherein the one or more
instructions that cause the one or more processors to
determine whether the pilot certification of the pilot
satisfies the threshold pilot certification, cause the
one or more processors to:
compare the pilot certification of the flight information with the threshold pilot certification of the
flight regulation, and
determine that the pilot certification of the pilot
satisfies the threshold pilot certification based on
comparing the pilot certification of the flight information with the threshold pilot certification of the
flight regulation.

12. The non-transitory computer-readable medium of
claim 10, wherein the flight information includes the location information and the pilot identifier, and further includes
information identifying a pilot location, and
the one or more instructions, when executed by the one or
more processors, further cause the one or more processors to:
identify a flight regulation of the plurality of flight
regulations;
the flight regulation including information identifying a threshold pilot certification to pilot, from the
pilot location, the UAV at the location; and
determine that a pilot certification of the pilot satisfies
the threshold pilot certification to pilot the UAV,
from the pilot location, at the location,
wherein the pilot certification of the pilot is obtained
based on the pilot identifier.

13. The non-transitory computer-readable medium of
claim 8, wherein the one or more instructions, when
executed by the one or more processors, cause the one or
more processors to:

when the authorization score does not satisfy the threshold, provide a notification to a ground control station
(GCS) associated with the UAV to indicate that the
flight is not authorized.

14. The non-transitory computer-readable medium of
claim 10, wherein the flight information includes the pilot
identifier, and the one or more instructions, when executed
by the one or more processors, further cause the one or more
processors to:
obtain a verification, from a ground control station (GCS)
associated with the UAV, that the pilot identifier corresponds to an actual pilot of the UAV.

15. A method, comprising:
receiving, by a device, a request to authorize a flight of an
unmanned aerial vehicle (UAV),
wherein the UAV is locked by a locking mechanism
until the flight is authorized,
the request including
flight information of the flight;
determining, by the device, a plurality of flight characteristics of the flight based on the flight information;
identifying, by the device, a plurality of flight regulations
of a flight regulation system,
each flight regulation, of the plurality of flight regulations, being associated with a respective flight characteristic of the plurality of flight characteristics, and
identifying the plurality of flight regulations further
comprising:
identifying a corresponding rule, associated with
each flight characteristic, of the plurality of flight
characteristics, that is enforced by an entity associated with the flight regulation system;
assigning, by the device, a weight to each flight characteristic, of the plurality of flight characteristics, based
on the associated flight regulation,
wherein each weight corresponds to how the associated
flight regulation is used to compute an authorization
score;
determining, by the device, the authorization score based on
the assigned weights and the plurality of flight characteristics; and
providing, by the device and from a data structure and
when determining that the authorization score satisfies
a threshold, a key to unlock the UAV to permit the flight
of the UAV to commence.

16. The method of claim 15, further comprising:
generating the key based on at least one of:
location information identifying the location of the
UAV,
a pilot identifier of the pilot of the flight,
a UAV identifier of the UAV, or
a flight plan for the flight.

17. The method of claim 15, wherein the the flight
information includes at least one of:
an identifier of the UAV,
location information identifying a location of the UAV, or
a pilot identifier of a pilot of the flight.

18. The method of claim 17, wherein the flight information includes the location information and the pilot identifier,
and further comprising:
obtaining a pilot certification of the pilot based on the
pilot identifier; and
determining whether the pilot certification of the pilot
satisfies a threshold pilot certification to pilot the UAV
at the location, wherein the threshold pilot certification is included in information from a flight regulation, of the plurality of flight regulations, and wherein the method, when determining whether the pilot certification of the pilot satisfies the threshold pilot certification, comprises:

comparing the pilot certification of the flight information with the threshold pilot certification of the flight regulation, and determining that the pilot certification of the pilot satisfies the threshold pilot certification based on comparing the pilot certification of the flight information with the threshold pilot certification of the flight regulation.

19. The method of claim 15, further comprising:
when the authorization score does not satisfy the threshold, providing a notification to a ground control station (GCS) associated with the UAV to indicate that the flight is not authorized.

20. The method of claim 17, wherein the flight information includes the pilot identifier, and further comprising:
obtaining a verification, from a ground control station (GCS) associated with the UAV, that the pilot identifier corresponds to an actual pilot of the UAV.

* * * * *